US 11,064,083 B2

(12) United States Patent
Ooki et al.

(10) Patent No.: US 11,064,083 B2
(45) Date of Patent: Jul. 13, 2021

(54) DOCUMENT READING APPARATUS

(71) Applicant: CANON KABUSHIKI KAISHA, Tokyo (JP)

(72) Inventors: Kenji Ooki, Ichihara (JP); Hidenori Sunada, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/931,892

(22) Filed: Jul. 17, 2020

(65) Prior Publication Data

US 2021/0037158 A1    Feb. 4, 2021

(30) Foreign Application Priority Data

Jul. 29, 2019 (JP) .............................. JP2019-138630

(51) Int. Cl.
  *H04N 1/40* (2006.01)
  *H04N 1/00* (2006.01)
  *H04N 1/401* (2006.01)
(52) U.S. Cl.
  CPC ..... *H04N 1/00811* (2013.01); *H04N 1/00814* (2013.01); *H04N 1/401* (2013.01); *H04N 1/40093* (2013.01)
(58) Field of Classification Search
  None
  See application file for complete search history.

(56) References Cited

U.S. PATENT DOCUMENTS

| | | | |
|---|---|---|---|
| 8,587,843 B2 | 11/2013 | Enami et al. ............... | 358/475 |
| 9,467,584 B2 | 10/2016 | Ooki .................. | H04N 1/00814 |
| 10,038,801 B2 | 7/2018 | Nakayoshi et al. ........................ | H04N 1/00726 |
| 10,110,776 B2 | 10/2018 | Sunada et al. ....... | H04N 1/3878 |
| 10,542,166 B2 * | 1/2020 | Seki .................... | H04N 1/00745 |
| 10,834,282 B2 * | 11/2020 | Ooki ...................... | H04N 1/401 |
| 2008/0278774 A1 | 11/2008 | Enami et al. ................. | 358/475 |
| 2012/0154879 A1 * | 6/2012 | Morita ................... | H04N 1/407 358/518 |
| 2016/0006893 A1 | 1/2016 | Ooki ............................. | 358/498 |
| 2017/0041478 A1 | 2/2017 | Nakayoshi et al. ......................... | H04N 2201/009 |
| 2017/0070619 A1 * | 3/2017 | Hamada ............. | H04N 1/00013 |

(Continued)

FOREIGN PATENT DOCUMENTS

| | | |
|---|---|---|
| JP | 2008-306707 | 12/2008 |
| JP | 2011-023990 | 2/2011 |

*Primary Examiner* — Dung D Tran
(74) *Attorney, Agent, or Firm* — Venable LLP

(57) ABSTRACT

A document reading apparatus including: a detector configured to detect presence of a document on a document tray; a conveyance unit configured to convey the document; a reading unit configured to read the document conveyed by the conveyance unit at a first position; and a reference member. When the detector detects the presence of a document, the reading unit reads the reference member to determine a shading correction value while being moved from a second position to a third position located between the first position and the second position. When the shading correction value is to be determined again in a period from when the shading correction value is determined until when a receiver receives an instruction to start reading, the reading unit reads the reference member while being moved from the second position toward the first position after having been moved from the third position to the second position.

10 Claims, 10 Drawing Sheets

(56) References Cited

U.S. PATENT DOCUMENTS

| | | | |
|---|---|---|---|
| 2017/0214816 A1* | 7/2017 | Yamakawa | H04N 1/00891 |
| 2017/0346983 A1* | 11/2017 | Ikeno | H04N 1/0313 |
| 2018/0048786 A1 | 2/2018 | Sunada et al. | H04N 1/3878 |
| 2018/0152595 A1* | 5/2018 | Shibaki | H04N 1/4076 |
| 2019/0174019 A1 | 6/2019 | Ooki | H04N 1/00087 |

* cited by examiner

DOCUMENT READING APPARATUS

BACKGROUND OF THE INVENTION

Field of the Invention

The present invention relates to a document reading apparatus which reads an image of a document.

Description of the Related Art

Hitherto, a document reading apparatus is configured to perform a scanning operation (hereinafter referred to as "pressing-plate reading") for reading an image of a document, which is placed on a platen glass and pressed by a pressing plate, by reading the document line by line while causing a motor to move a reading portion along a guide. In addition, a document reading apparatus including a conveyance unit is also configured to perform a scanning operation (hereinafter referred to as "flow reading") for causing the conveyance unit to convey documents stacked on a document tray to a flow reading position one by one and causing the reading portion, which is located at the flow reading position, to read an image of each of the documents. In the flow reading, it is possible to continuously read the images of a plurality of documents. The document reading apparatus may be provided to a copying machine serving as the image forming apparatus. The copying machine provided with the document reading apparatus is required to reduce a first copy output time (hereinafter referred to as "FCOT"), which is a time period to be taken after the start of document reading until the output of a recording medium having an image formed thereon.

In general, before the pressing-plate reading and the flow reading are performed, a preparation operation of reading a white reference member with reference data being set as a target value to calculate a shading correction value is performed. In order to perform the preparation operation before a job, in Japanese Patent Application Laid-Open No. 2011-023990, a change from an open state to a closed state of a pressing plate is detected to output a trigger signal, and in Japanese Patent Application Laid-Open No. 2008-306707, it is detected that documents have been stacked on a document tray to output a trigger signal. The preparation operation is performed before the start of a job based on the trigger signal, to thereby reduce the FCOT.

In Japanese Patent Application Laid-Open No. 2011-023990 and Japanese Patent Application Laid-Open No. 2008-306707, each time a trigger signal is received, a shading operation of reading a white reference member is performed as the preparation operation before a document is actually read. The reference data to be set as the target value for calculating the shading correction value is different between the pressing-plate reading and the flow reading. For example, when the trigger signal output based on the change from the open state to the closed state of the pressing plate is received, a shading correction value for pressing-plate reading is calculated. When the trigger signal output based on the fact that documents have been stacked on the document tray is received, a shading correction value for flow reading is calculated. In order to calculate the shading correction value for flow reading, the reading portion is moved from a waiting position to the flow reading position by passing under the white reference member.

However, in a case where the reading portion has been moved to the flow reading position, when an assumed reading mode (black-and-white reading (BW), color reading (CL), or resolution) is changed from a reading mode of a job to be started, it is required to return the reading portion to the waiting position to again perform the shading operation. Needless time is required due to a recovery operation of returning the reading portion to the waiting position in order to again perform the shading operation, and thus the FCOT may increase. A user recognizes the start of the job after waiting for the end of the recovery operation, and is therefore expected to wait for a longer time period.

SUMMARY OF THE INVENTION

In order to solve the above-mentioned problem, according to an embodiment of the present invention, there is provided a document reading apparatus, comprising: a document tray on which a document is to be stacked; a detector configured to detect presence or absence of the document on the document tray; a conveyance unit configured to convey the document stacked on the document tray; a platen on which a document is to be placed; a reading unit which is movable in a predetermined direction, the reading unit configured to read the document while being moved under the platen in the predetermined direction in a case where the document placed on the platen is read, and the reading unit configured to read the document in a state in which the reading unit is stationary at a first position in the predetermined direction in a case where the document conveyed by the conveyance unit is read; a receiver configured to receive an instruction indicating starting of a reading of the document; a reference member; a determiner configured to determine a shading correction value based on a result of reading the reference member by the reading unit; and a corrector configured to perform shading correction using the shading correction value on image data which is output from the reading unit, wherein, in a case where the detector detects a state in which the document is present on the document tray, the reading unit reads the reference member while being moved from a second position toward the first position and stops a third position, the third position being located between the first position and the second position in the predetermined direction, wherein, in a case where the receiver receives the instruction and the detector detects the state in which the document is present on the document tray, the reading unit stopped at the third position moves from the third position to the first position and reads the document conveyed by the conveyance unit, and wherein, in a case where the shading correction value is to be again determined in a period from a first timing when the shading correction value has been determined due to the detector detecting the state in which the document is present on the document tray until a second timing when the receiver receives the instruction, the reading unit stopped at the third position moves from the third position to the second position and reads the reference member while being moved from the second position toward the first position.

Further features of the present invention will become apparent from the following description of exemplary embodiments with reference to the attached drawings.

DESCRIPTION OF THE EMBODIMENTS

Document Reading Apparatus

Figure 1:
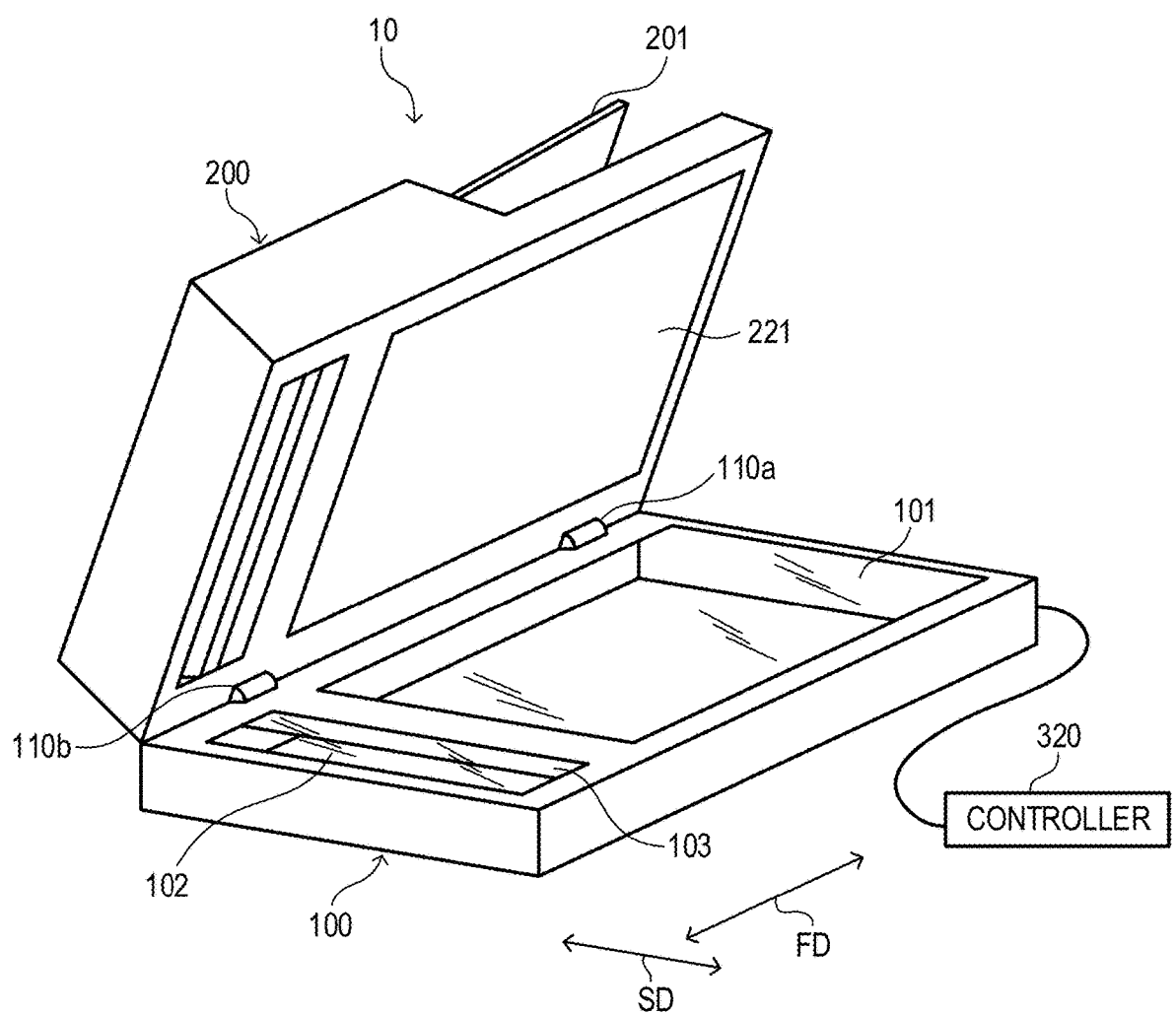
FIG. 1 is a perspective view of a document reading apparatus.

Now, a document reading apparatus 10 is described with reference to FIG. 1. FIG. 1 is a perspective view of the document reading apparatus 10. The document reading apparatus 10 includes a document reading portion 100 configured to read an image of a document and a document feeding portion (automatic document feeder; hereinafter referred to as "ADF") 200 configured to feed the document to the document reading portion 100. A controller 320 is connected to the document reading apparatus 10. The controller 320 may be provided in the document reading portion 100 or in the ADF 200, or may be provided separately in the document reading portion 100 and the ADF 200. The ADF 200 is connected to the document reading portion 100 in an openable and closable manner by open/close hinges 110a and 110b, which are provided on a deep side of an upper surface of the document reading portion 100.

Document Reading Portion

Figure 2:
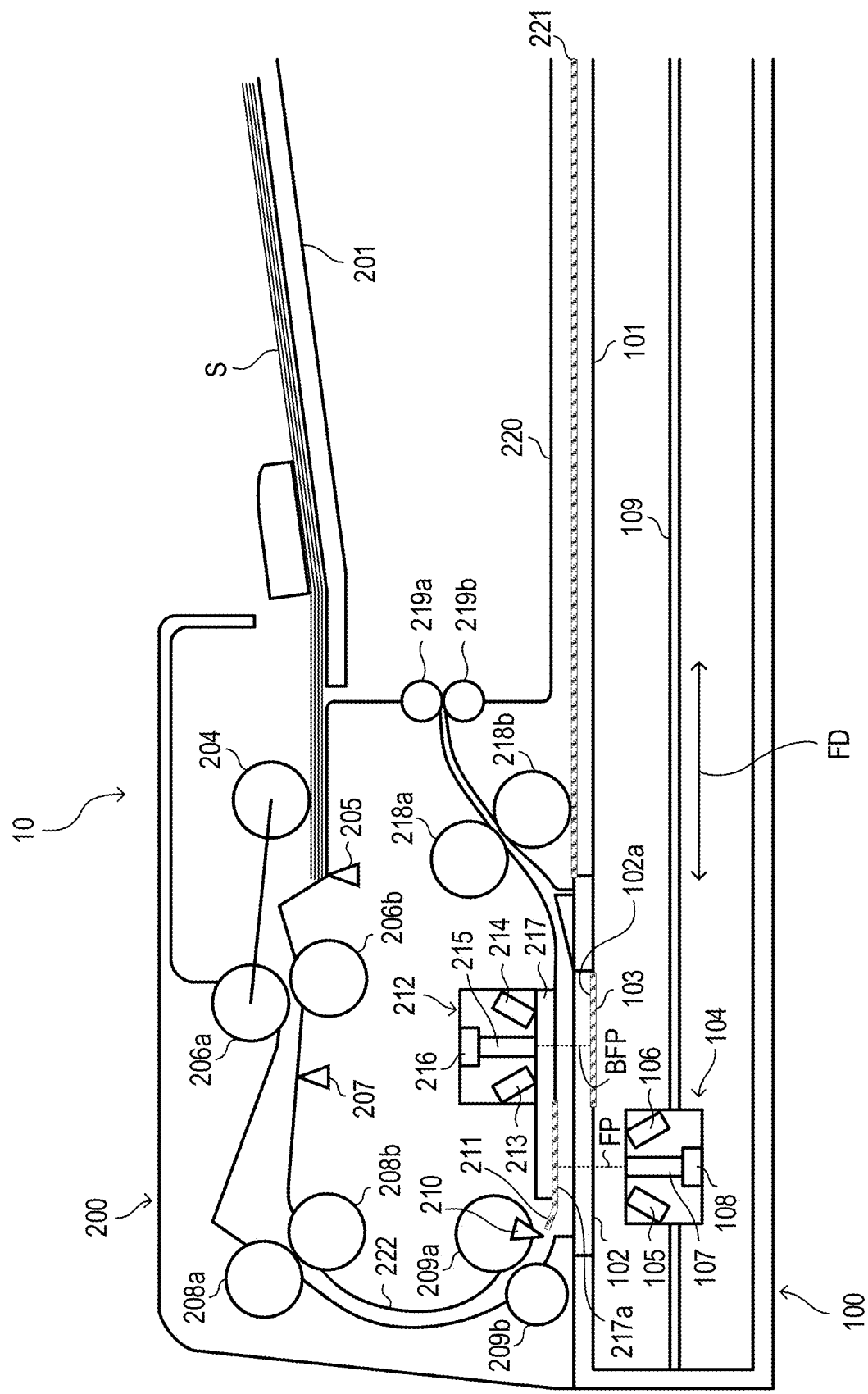
FIG. 2 is a cross-sectional view of a part of the document reading apparatus.

The document reading portion 100 is described with reference to FIG. 1 and FIG. 2. FIG. 2 is a cross-sectional view of a part of the document reading apparatus 10. The document reading portion 100 includes a platen glass 101 serving as a platen (document placing portion) on which a document is to be placed, a front side reading portion (first reading unit) 104, an optical motor 305 illustrated in FIG. 3, a guide 109, a front side flow reading glass 102, and a white reference member (reference member) 103. The front side flow reading glass 102 is provided integrally with a back side white opposing member 102a. In a case of pressing-plate reading, a document is placed on the platen glass 101. When the ADF 200 serving as an openable and closable member is closed, the document is fixed by being pressed against the platen glass 101 by a white pressing plate (pressing member) 221 of the ADF 200. The document reading portion 100 causes the optical motor 305 serving as a moving unit to move the front side reading portion 104 along the guide 109 in a first direction (predetermined direction) FD. While being moved in the first direction FD, the front side reading portion 104 reads an image on the front side of the document placed on the platen glass 101 by reading the image on the front side of the document line by line in a second direction SD, which is perpendicular to the first direction FD. In a case of flow reading, a document is conveyed onto the front side flow reading glass 102 by the ADF 200. The document reading portion 100 causes the front side reading portion 104 to read an image on the front side (first side) of the document being conveyed on the front side flow reading glass 102.

ADF

The ADF 200 is described with reference to FIG. 2. The ADF 200 includes a document tray 201 serving as a document stacking portion on which a document bundle S formed of at least one document is to be stacked, a separation roller pair 206a and 206b serving as a separation mechanism for separating documents one by one, and a pickup roller 204. The separation roller pair 206a and 206b also have a function of regulating advancement of the document bundle S from the document tray 201 downstream in a feeding direction before the start of feeding the document. The document tray 201 includes a document sensor 205 serving as a detector configured to detect presence or absence of the documents on the document tray 201. When receiving an instruction to start feeding the documents, the ADF 200 feeds documents at the top level of the document bundle S by causing the pickup roller 204 to fall onto the uppermost side of the document bundle S stacked on the document tray 201 and causing the pickup roller 204 to rotate. From the documents fed by the pickup roller 204, one document at the top level is separated due to an action of the separation roller pair 206a and 206b to be conveyed. The separation of the document is achieved by a known separation technology.

The document separated by the separation roller pair 206a and 206b is conveyed to a registration roller pair 208a and 208b to be brought into abutment against a nip of the registration roller pair 208a and 208b being stopped. The document having a leading edge abutted against the nip of the registration roller pair 208a and 208b is formed in a loop shape, to thereby correct skew feeding of the document. A conveyance path 222 for conveying the document passing through the registration roller pair 208a and 208b to the front side flow reading glass 102 is arranged on downstream of the registration roller pair 208a and 208b. The document that has been conveyed to the conveyance path 222 by rotation of the registration roller pair 208a and 208b is then conveyed to a double-sided reading position by an upstream-of-read roller pair 209a and 209b serving as a conveyance unit.

The double-sided reading position includes a reading position (hereinafter referred to as "flow reading position") FP for reading an image on the front side (first side) of the document being conveyed by the upstream-of-read roller pair 209a and 209b. The double-sided reading position also includes a back side flow reading position BFP for reading an image on the back side (second side) opposite to the front side of the document being conveyed by the upstream-of-read roller pair 209a and 209b. The document is conveyed through space between the front side flow reading glass 102 and a back side flow reading glass 217. The front side reading portion 104 is movable between a waiting position (second position) WP (FIG. 5A) and the flow reading position (first position) FP. The front side reading portion 104 is configured to read an image on the front side of the document at the flow reading position FP. The ADF 200 includes a back side reading portion (second reading unit) 212 and the back side flow reading glass 217. The back side flow reading glass 217 is provided integrally with a front side white opposing member 217a. The back side reading portion 212 is configured to read an image on the back side of the document at the back side flow reading position BFP.

In a case of front side flow reading, when passing under the front side white opposing member 217a provided integrally with the back side flow reading glass 217, the document is illuminated from under the front side flow reading glass 102 by front side LEDs 105 and 106 each serving as a light source. Light reflected from the front side of the document is received by a front side image sensor 108 through a front side lens array 107. Image data on the front side of the document is generated based on output from the front side image sensor 108.

In a case of double-sided flow reading, the image on the front side of the document is read by the front side reading portion 104 as described above. In regard to the reading of the image on the back side of the document, when passing above the back side white opposing member 102a provided integrally with the front side flow reading glass 102, the document is illuminated from above the back side flow reading glass 217 by back side LEDs 213 and 214. Light reflected from the back side of the document is received by a back side image sensor 216 through a back side lens array 215. Image data on the back side of the document is generated based on output from the back side image sensor 216.

The document from which the image has been read is discharged onto a discharge tray 220 by a downstream-of-read roller pair 218a and 218b and a discharge roller pair 219a and 219b. The front side reading portion 104 and the back side reading portion 212 are not limited to such a contact image sensor (CIS) as illustrated in FIG. 2, and may be a charge coupled device (CCD) image sensor formed of a reduction optical system using a lens array and a mirror.

Controller

Figure 3:
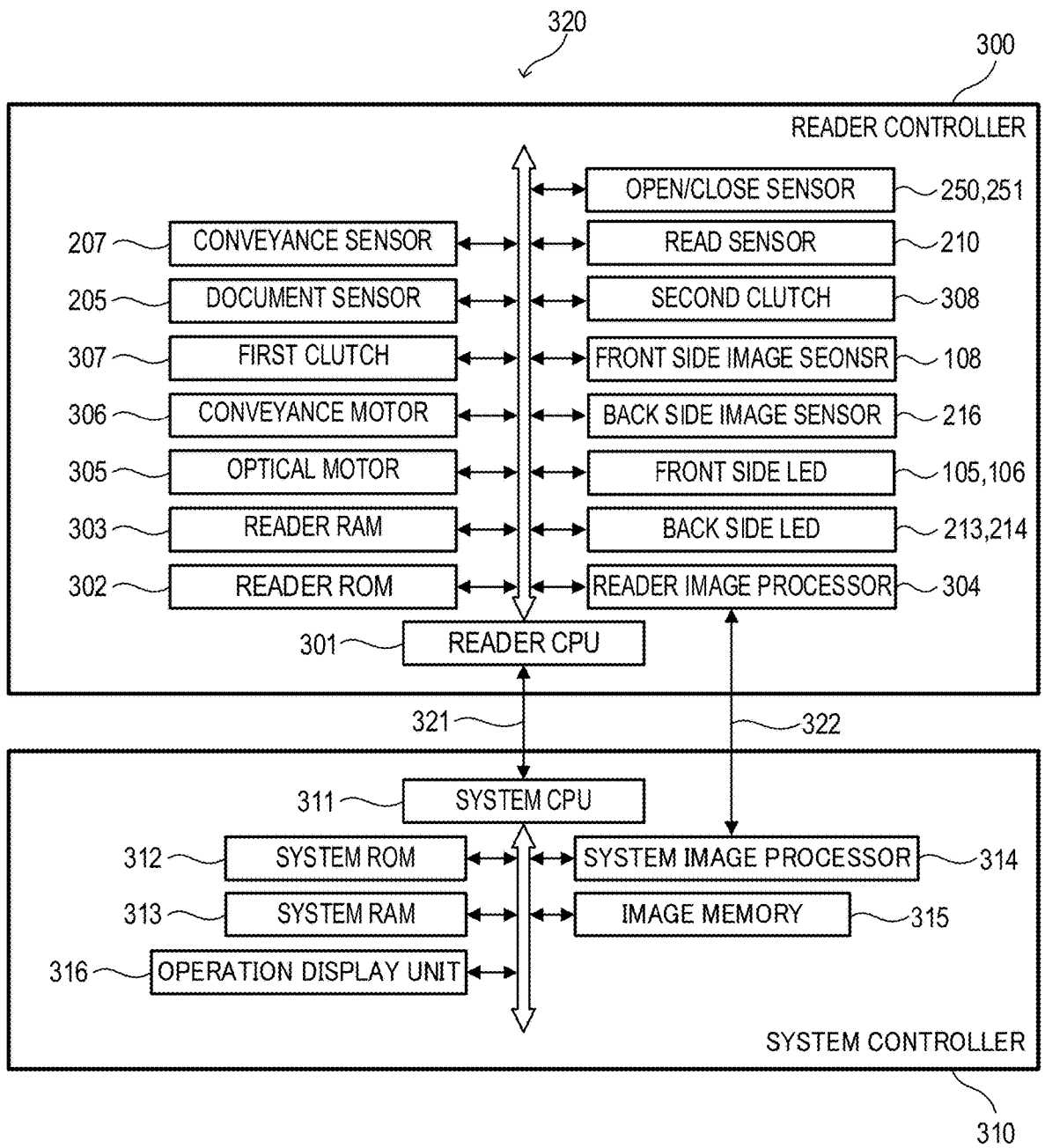
FIG. 3 is a block diagram of a controller.

Now, the controller 320 is described with reference to FIG. 3. FIG. 3 is a block diagram of the controller 320. The controller 320 includes a reader controller 300 and a system controller 310. The reader controller 300 includes a reader CPU 301 being a central processing unit, a reader ROM 302 being a read-only memory, and a reader RAM 303 being a random access memory. The reader ROM 302 stores a control program. The reader RAM 303 stores input data and data for work.

The reader CPU 301 is electrically connected to a conveyance motor 306, a first clutch 307, and a second clutch 308. The conveyance motor 306 is connected to the registration roller pair 208a and 208b via the first clutch 307. The reader CPU 301 uses the first clutch 307 to control the rotation and stopping of the registration roller pair 208a and 208b. The conveyance motor 306 is connected, directly or via the second clutch 308, to the pickup roller 204, the separation roller pair 206a and 206b, the upstream-of-read roller pair 209a and 209b, the downstream-of-read roller pair 218a and 218b, and the discharge roller pair 219a and 219b. The reader CPU 301 uses the conveyance motor 306 and the second clutch 308 to switch the driving and stopping of each roller, to thereby convey a document.

The reader CPU 301 is also connected to the document sensor 205 configured to detect the presence or absence of a document on the document tray 201, the conveyance sensor 207 configured to detect a document on the conveyance path 222, and a read sensor 210. The conveyance motor 306 is a pulse motor. The reader CPU 301 controls a pulse count of a drive signal for driving the conveyance motor 306. A conveyance distance of the document being conveyed can be calculated based on the pulse count. The reader CPU 301 controls the conveyance of the document based on the conveyance distance calculated from the pulse count.

In order to implement a document reading function, the reader CPU 301 is connected to the front side LEDs 105 and 106, the front side image sensor 108, the back side LEDs 213 and 214, and the back side image sensor 216. The reader CPU 301 causes a reader image processor 304 to perform various kinds of image processing on image data read by the front side image sensor 108 and the back side image sensor 216, and to transmit the image data to the system controller 310 through an image data bus 322. The reader CPU 301 then notifies the system controller 310 of a vertical synchronizing signal, which is a reference of an edge of the image in a sub-scanning direction, and a horizontal synchronizing signal, which is a reference of an edge of the image on one line in a main scanning direction, through the controller IF in accordance with a document reading timing.

The system controller 310 includes a system CPU 311, a system ROM 312, and a system RAM 313. The system CPU 311 exchanges data relating to document reading control with the reader CPU 301 through a command data bus 321. The image data processed by the reader image processor 304 is transferred to a system image processor 314 included in the system controller 310 through the image data bus 322. The system image processor 314 stores the image data in an image memory 315 after subjecting the image data to color determination or other such predetermined image processing. The system controller 310 also includes an operation display unit 316. An interface with a user is controlled by the system CPU 311 via the operation display unit 316. The user operates the operation display unit 316 to instruct to set a reading mode and instruct to start reading. The system CPU 311 receives the instructions of the user from the operation display unit 316 to perform control corresponding to the instructions of the user.

Open/Close Sensors

Figure 4A:
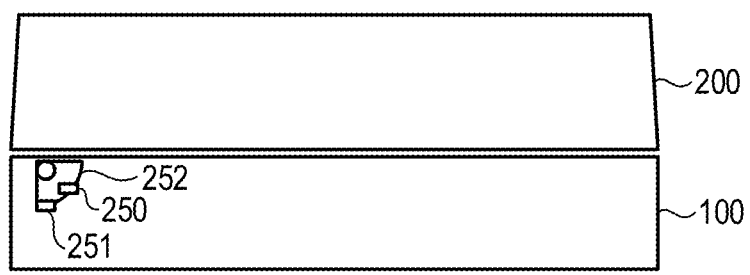
FIG. 4A, FIG. 4B, and FIG. 4C are diagrams for illustrating an opening and closing operation of an ADF with respect to a document reading portion.
Figure 4B:
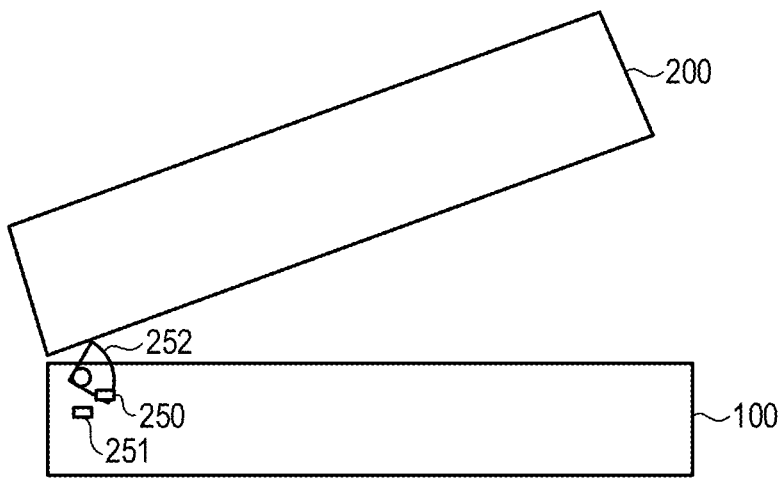
Figure 4C:
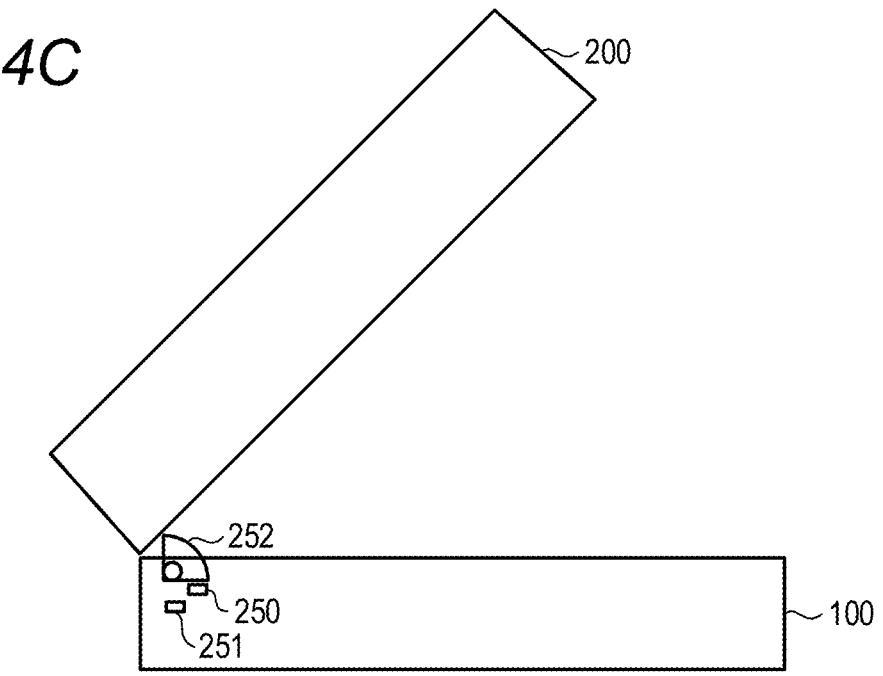

Now, open/close sensors 250 and 251 configured to detect opening or closing of the ADF 200 is described with reference to FIG. 4A, FIG. 4B, and FIG. 4C. FIG. 4A, FIG. 4B, and FIG. 4C are diagrams for illustrating an opening and closing operation of the ADF 200 with respect to the document reading portion 100. FIG. 4A is a diagram for illustrating a state in which the ADF 200 is closed. FIG. 4B is a diagram for illustrating a state in which the ADF 200 is being closed. FIG. 4C is a diagram for illustrating a full-open state of the ADF 200. The opening or closing detection of the ADF 200 is performed through use of two open/close sensors 250 and 251. The open/close sensors 250 and 251 are configured to detect a flag 252 provided to the ADF 200. The flag 252 is moved in accordance with the opening and closing operation of the ADF 200. In the state in which the ADF 200 is closed as illustrated in FIG. 4A, the open/close sensors 250 and 251 both detect the flag 252. In the state in which the ADF 200 is being closed as illustrated in FIG. 4B, only the open/close sensor 250 detects the flag 252. In the full-open state of the ADF 200 illustrated in FIG. 4C, none of the open/close sensors 250 and 251 detects the flag 252.

As the open/close sensors 250 and 251, for example, photo interrupters are used. The reader CPU 301 of the document reading apparatus 10 detects an open or closed state of the ADF 200 based on optical path states of the photo interrupters serving as the open/close sensors 250 and 251. The open/close sensors 250 and 251 and the flag 252 form an opening or closing detecting unit configured to detect the opening or closing of the ADF 200. In place of the ADF 200, a pressing member that is not provided with an automatic document feeding mechanism may be used. Even in that case, the open or closed state of the pressing member configured to press the document placed on the platen glass 101 can be detected through use of the open/close sensors 250 and 251 and the flag 252.

Operation of Front Side Reading Portion

Figure 5A:
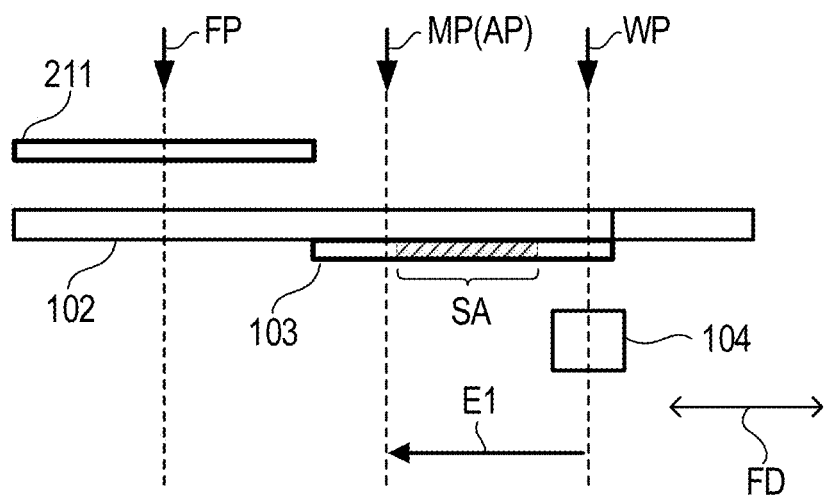
FIG. 5A, FIG. 5B, and FIG. 5C are explanatory diagrams of a shortest movement waiting position of a front side reading portion.
Figure 5B:
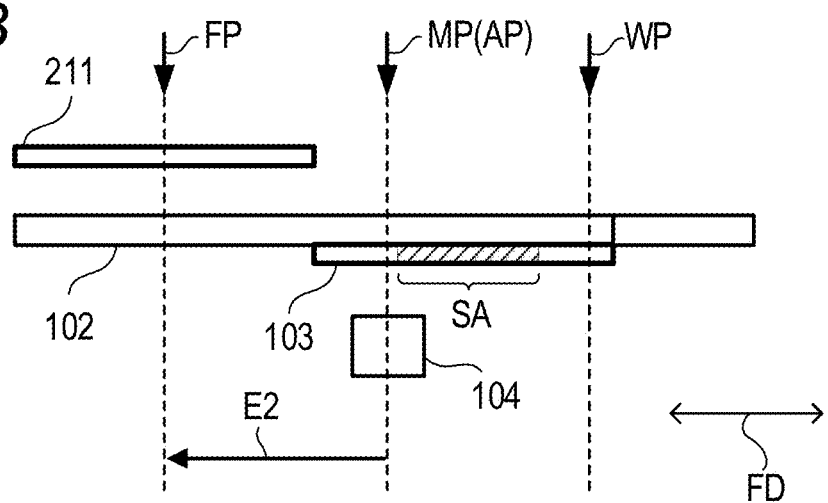
Figure 5C:
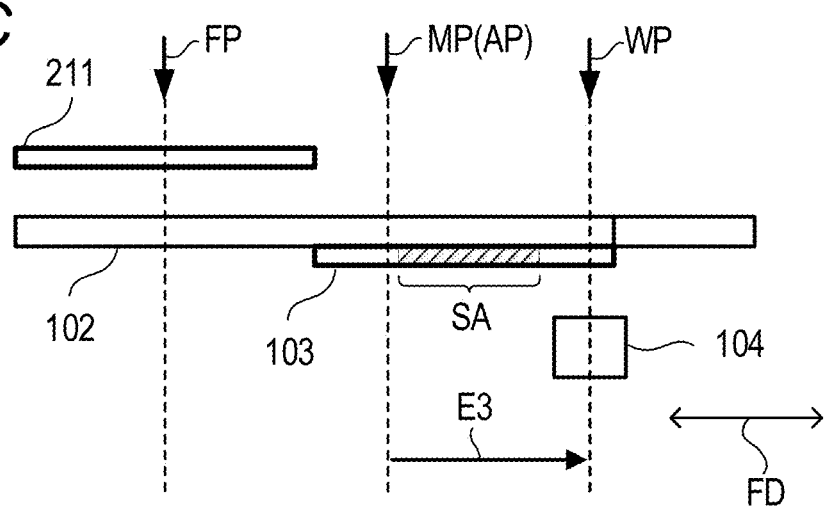

Next, an operation of moving the front side reading portion (carriage) 104 when the document bundle S is placed on the document tray 201 of the ADF 200 is described with reference to FIG. 5A, FIG. 5B, and FIG. 5C. FIG. 5A, FIG. 5B, and FIG. 5C are explanatory diagrams of a shortest movement waiting position (third position) MP, which is set as a second waiting position of the front side reading portion 104. As illustrated in FIG. 5A, in a normal state, the front side reading portion 104 is stopped (caused to wait) at the waiting position (first waiting position) WP set as a home position. The front side reading portion 104 at the waiting position WP is positioned under the front side flow reading glass 102 and the white reference member 103. The waiting position WP falls out of a shading region SA of the white reference member 103. The waiting position WP is located on a side opposite to the flow reading position FP with respect to the shading region SA.

When the document bundle S is placed on the document tray 201 of the ADF 200, the front side reading portion 104 performs a shading operation while passing through the shading region SA as indicated by an arrow E1 of FIG. 5A, and is then stopped (caused to wait) at the shortest movement waiting position MP as illustrated in FIG. 5B. Thereafter, when a job of flow reading is performed, the front side reading portion 104 is moved from the shortest movement waiting position MP to the flow reading position FP as indicated by an arrow E2 of FIG. 5B.

As illustrated in FIG. 5A, the shortest movement waiting position MP is located between the waiting position WP and the flow reading position FP. In the embodiment, the shortest movement waiting position MP is the same position as an acceleration start position AP for starting acceleration of the front side reading portion 104 in the pressing-plate reading. The shortest movement waiting position MP and the acceleration start position AP may be set different from each other. The front side reading portion 104 is caused to wait at the shortest movement waiting position MP, to thereby be able to move the front side reading portion 104 to the flow reading position FP immediately when the job of the flow reading is performed in an assumed reading mode. Examples of the reading mode include black-and-white reading (BW), color reading (CL), main-scanning resolution, sub-scanning resolution, copying (COPY), facsimile (FAX), and transmission (SEND). When the reading mode of the job to be started is different from the assumed reading mode, it is required to return the front side reading portion 104 to the waiting position WP in order to again perform the shading operation. The shortest movement waiting position MP is closer to the waiting position WP than the flow reading position FP, and hence a time period for returning the front side reading portion 104 from the shortest movement waiting position MP to the waiting position WP is shorter than a time period for returning the front side reading portion 104 from the flow reading position FP to the waiting position WP.

Figure 6:
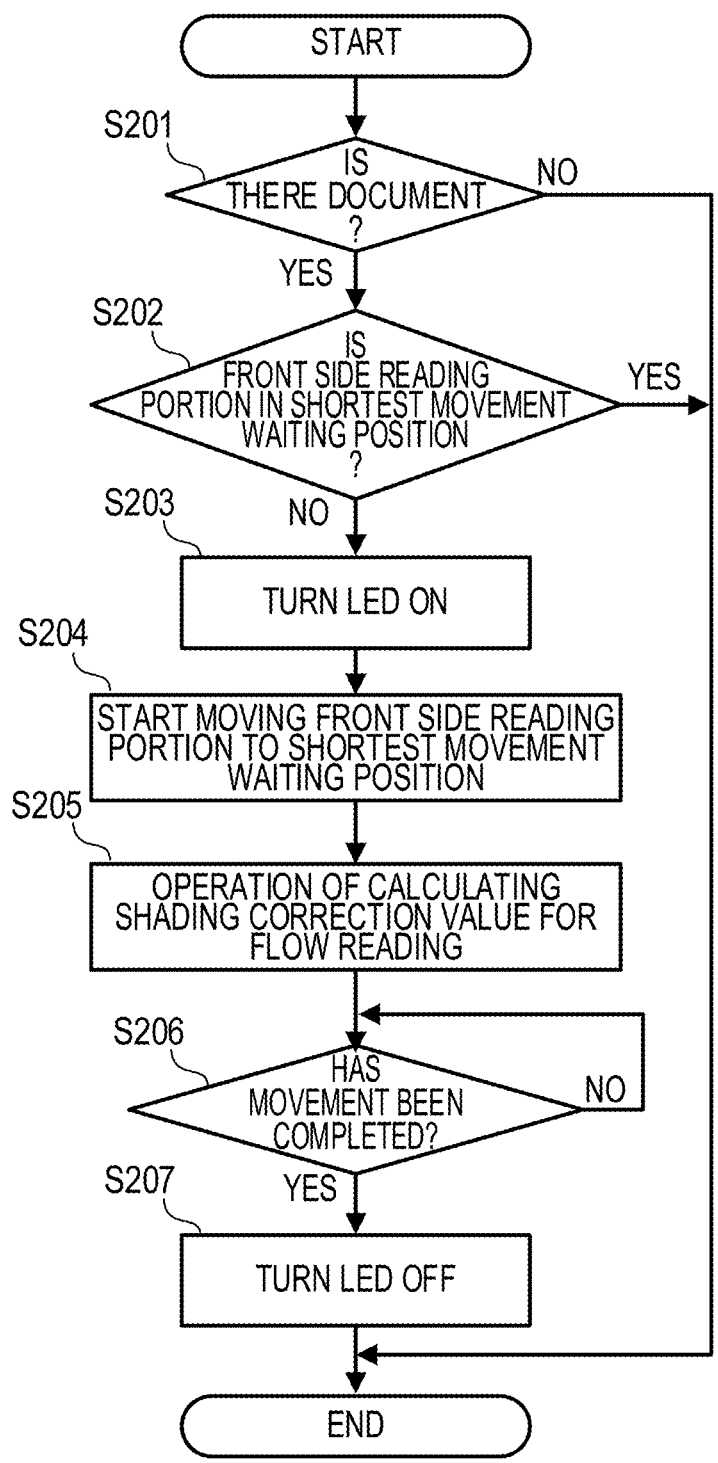
FIG. 6 is a flow chart for illustrating a control sequence to be performed when a document on a document tray is detected.

FIG. 6 is a view explaining a control sequence to be performed by the document reading apparatus 10 when the user places a document on the document tray 201 of the ADF 200. When the user places a document on the document tray 201 of the ADF 200, a detection signal of the document sensor 205 is changed from a signal indicating that a document is not present on the document tray 201 to a signal indicating that a document is present on the document tray 201. When it is detected that a state in which a document is not present on the document tray 201 of the ADF 200 has been changed to a state in which a document is present on the document tray 201 of the ADF 200, the document reading apparatus 10 performs the operation of calculating the shading correction value for flow reading based on a predetermined condition. The reader CPU 301 performs the operation of calculating the shading correction value for flow reading when a document is placed on the ADF 200, in accordance with the control program stored in the reader ROM 302.

The reader CPU 301 determines based on the detection signal of the document sensor 205 whether or not a document is present on the document tray 201 of the ADF 200 (Step S201). When it is determined that a document is not present on the document tray 201 of the ADF 200 (NO in Step S201), the reader CPU 301 ends the processing. Incidentally, in a case where there is no document on the document tray 201 of the ADF 200 and the front side reading unit 104 is not at the waiting position WP, the reader CPU 301 moves the front side reading unit 104 to the waiting position WP. When it is determined that a document is present on the document tray 201 of the ADF 200 (YES in Step S201), the reader CPU 301 determines whether or not the front side reading portion 104 is located at the shortest movement waiting position MP (Step S202). When the front side reading portion 104 is located at the shortest movement waiting position MP (YES in Step S202), the reader CPU 301 ends the processing. When the front side reading portion 104 is not located at the shortest movement waiting position MP (NO in Step S202), the reader CPU 301 turns on the front side LEDs 105 and 106 (Step S203).

The reader CPU 301 moves the front side reading portion 104 to the shortest movement waiting position MP (Step S204). While being moved to the shortest movement waiting position MP, the front side reading portion 104 performs the operation of calculating the shading correction value for flow reading (Step S205). The reader CPU 301 calculates the shading correction value for flow reading in the shading region SA. After the operation of calculating the shading correction value for flow reading, the reader CPU 301 determines whether or not movement of the front side reading portion 104 to the shortest movement waiting position MP has been completed (Step S206). When the movement of the front side reading portion 104 to the shortest movement waiting position MP has not been completed (NO in Step S206), the reader CPU 301 waits until the movement of the front side reading portion 104 to the shortest movement waiting position MP has been completed. When the movement of the front side reading portion 104 to the shortest movement waiting position MP has been completed (YES in Step S206), the reader CPU 301 turns off the front side LEDs 105 and 106 (Step S204), to thereby end the document detecting judgment processing.

As mentioned above, in the embodiment, in the case where the document bundle S is placed on the document tray 201 of the ADF 200, the front side reading portion 104 is caused to wait at the shortest movement waiting position MP between the waiting position WP and the flow reading position FP after the execution of the shading operation. Therefore, an efficient and optimal waiting time is achieved even when the front side reading portion 104 is moved to the flow reading position FP as indicated by the arrow E2 of FIG. 5B at the start of the job or even when the front side reading portion 104 is moved to the waiting position WP as indicated by an arrow E3 of FIG. 5C in the recovery operation.

Figure 7:
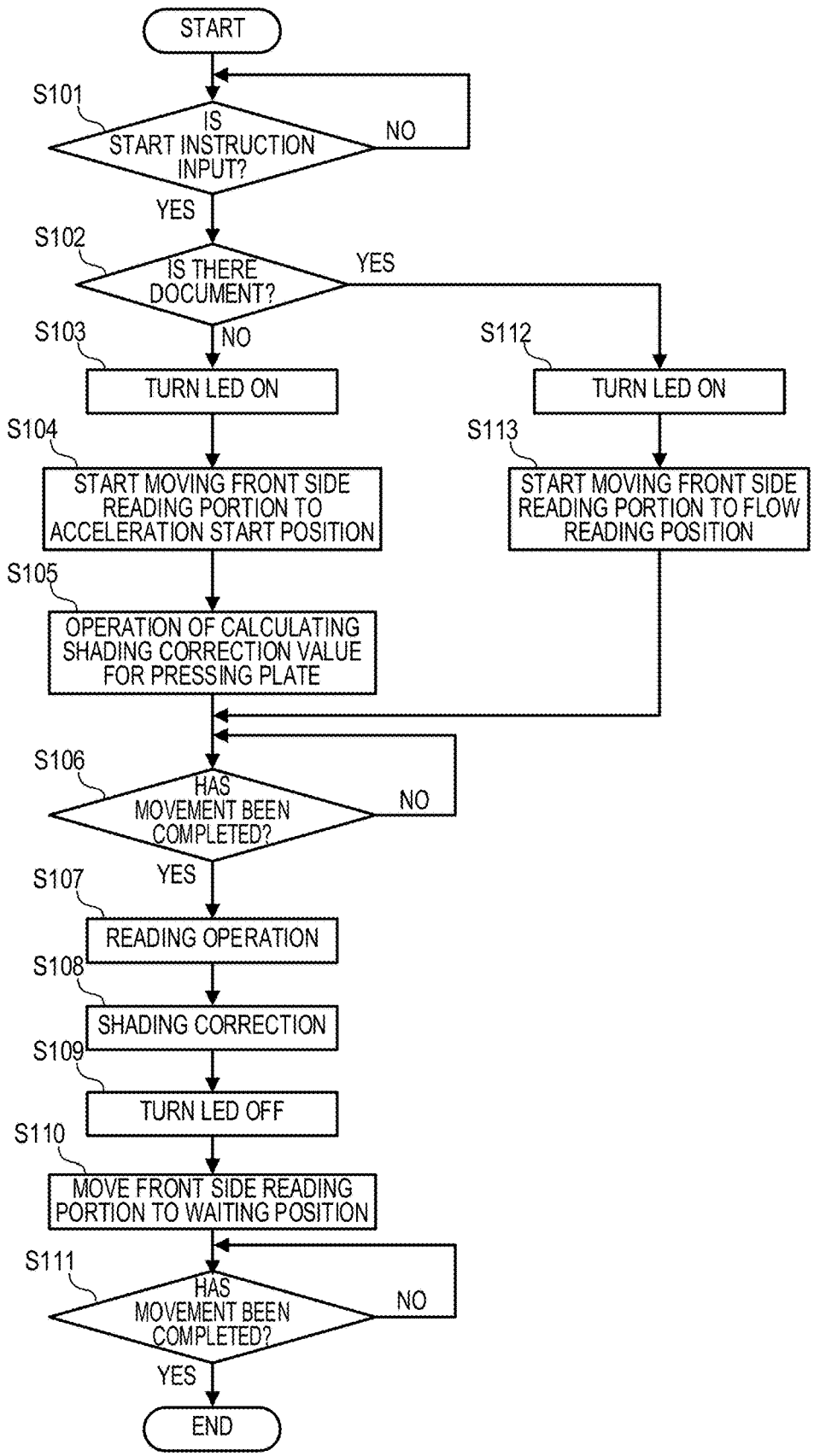
FIG. 7 is a flow chart for illustrating a document reading operation of the document reading apparatus.

FIG. 7 is a flow chart for illustrating the document reading operation of the document reading apparatus 10. The reader CPU 301 performs the document reading operation in accordance with the control program stored in the reader ROM 302. The reader CPU 301 determines whether or not an instruction (a start instruction) to start reading is input from the operation display unit 316 (Step S101). When the start instruction is not input (NO in Step S101), the reader CPU 301 waits until the start instruction is input. When it is determined that the start instruction is input (YES in Step S101), the reader CPU 301 determines whether or not there is a document on the document tray 201 (Step S102). When there is no document on the document tray 201 (NO in Step S102), the reader CPU 301 turns on the front side LEDs 105 and 106 of the front side reading portion 104 (Step S103). Meanwhile, the fact that there is no document on the document tray 201 in Step S102 corresponds to the fact that the start instruction in Step S101 is a start instruction to start the pressing-plate reading.

FIG. 8A, FIG. 8B, FIG. 8C, and FIG. 8D are explanatory diagrams for illustrating how the front side reading portion 104 is moved when the pressing-plate reading is performed. The reader CPU 301 starts moving the front side reading portion 104 from the waiting position WP to the acceleration start position AP as indicated by an arrow E4 of FIG. 8A (Step S104). While moving to the acceleration start position AP, the front side reading portion 104 performs an operation of calculating the shading correction value for a pressing plate (Step S105). The reader CPU 301 calculates the shading correction value for a pressing plate in the shading region SA based on a target value (a target) for the pressing-plate reading. After calculating the shading correction value for a pressing plate, the reader CPU 301 determines whether or not the movement of the front side reading portion 104 to the acceleration start position AP has been completed (Step S106). When the movement of the front side reading portion 104 to the acceleration start position AP has not been completed (NO in Step S106), the reader CPU 301 waits until the movement of the front side reading portion 104 to the acceleration start position AP has been completed.

Figure 8A:
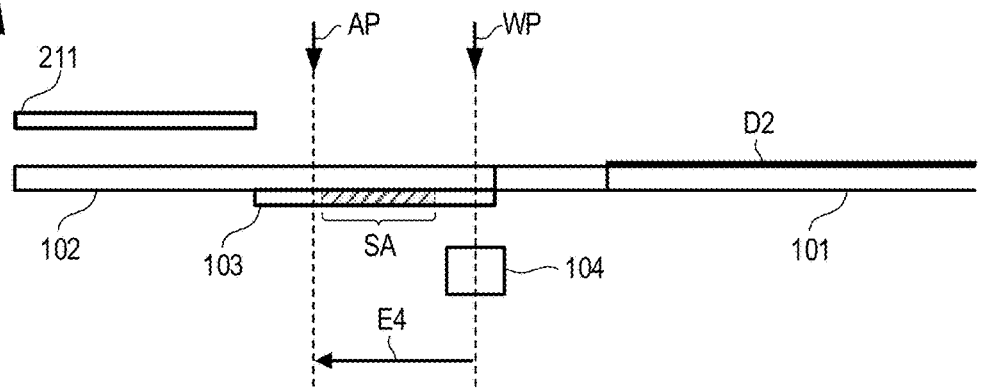
FIG. 8A, FIG. 8B, FIG. 8C, and FIG. 8D are explanatory diagrams for illustrating how the front side reading portion is moved when pressing-plate reading is performed.
Figure 8B:
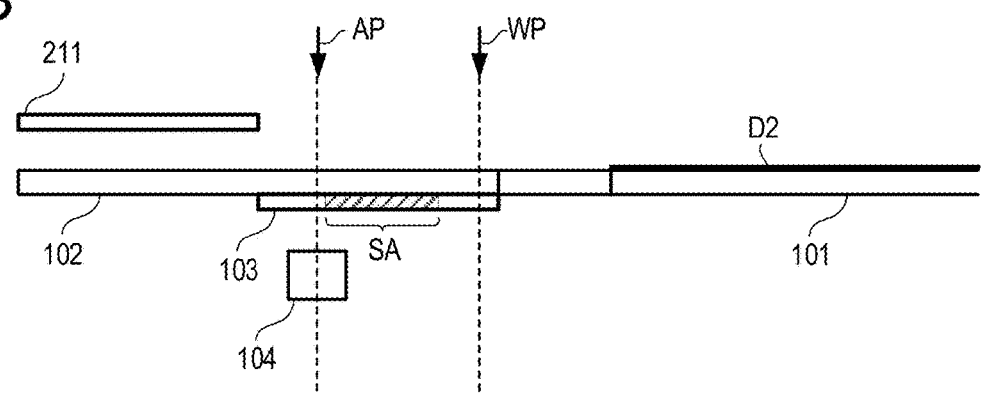
Figure 8C:
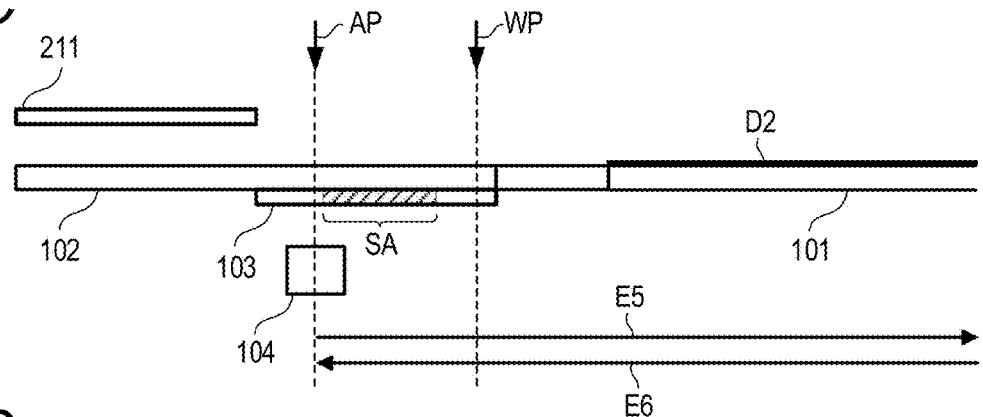
Figure 8D:
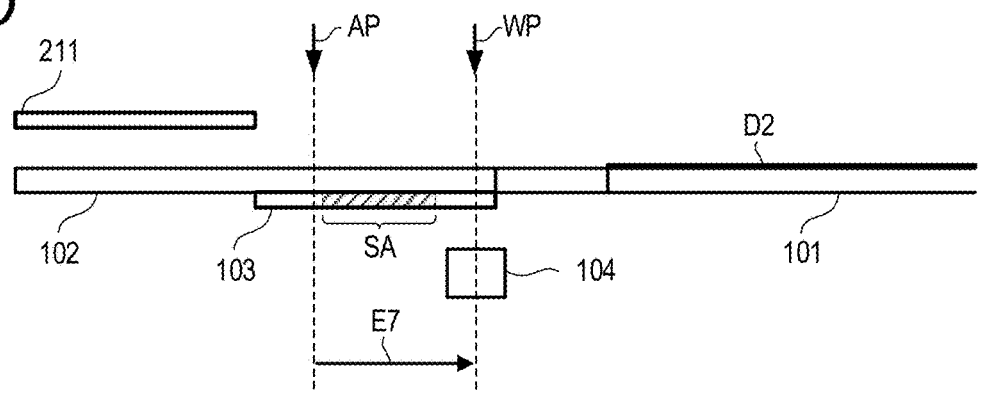

As illustrated in FIG. 8B, the movement of the front side reading portion 104 to the acceleration start position AP has been completed (YES in Step S106). As indicated by an arrow E5 of FIG. 8C, the reader CPU 301 performs the reading operation of reading an image on the front side of a document D2 placed on the platen glass 101 while moving the front side reading portion 104 (Step S107). The reader CPU 301 performs the shading correction on the image data through use of the shading correction value for a pressing plate (Step S108). When the reading operation is finished, the reader CPU 301 returns the front side reading portion 104 to the acceleration start position AP as indicated by an arrow E6 of FIG. 8C. The reader CPU 301 turns off the front side LEDs 105 and 106 of the front side reading portion 104 (Step S109). As indicated by an arrow E7 of FIG. 8D, the reader CPU 301 moves the front side reading portion 104 to the waiting position WP (Step S110). The reader CPU 301 determines whether or not the movement of the front side reading portion 104 to the waiting position WP has been completed (Step S111). When the movement of the front side reading portion 104 to the waiting position WP has not been completed (NO in Step S111), the reader CPU 301 waits until the movement of the front side reading portion 104 to the waiting position WP has been completed. When the movement of the front side reading portion 104 to the waiting position WP has been completed (YES in Step S111), the reader CPU 301 ends the job.

When it is determined in Step S102 that there is a document on the document tray 201 (YES in Step S102), the front side LEDs 105 and 106 are turned on (Step S112). Meanwhile, the fact that there is a document on the document tray 201 in Step S102 corresponds to the fact that the start instruction in Step S101 is a start instruction to start a flow reading. At this time, the front side reading portion 104 is waiting at the shortest movement waiting position MP illustrated in FIG. 5B. The reader CPU 301 starts moving the front side reading portion 104 from the shortest movement waiting position MP to the flow reading position FP as indicated by the arrow E2 of FIG. 5B (Step S113), and waits until the movement has been completed (Step S106). When the movement of the front side reading portion 104 to the flow reading position FP has been completed (YES in Step S106), the reader CPU 301 performs the reading operation of causing the front side reading portion 104 to read the image on the front side of the document D1 being conveyed onto the front side flow reading glass 102 (Step S107). The reader image processor 304 performs the shading correction on the image data through use of the shading correction value for flow reading (Step S108). The subsequent processing steps are the same as those described above, and hence description thereof is omitted.

In order to prevent a surface of the front side flow reading glass 102 from being charged, the surface of the front side flow reading glass 102 is subjected to antistatic coating. In addition, in order to prevent dust from adhering to the surface of the front side flow reading glass 102, the surface of the front side flow reading glass 102 is subjected to dust proofing. An image read through the front side flow reading glass 102 becomes darker due to the antistatic coating and the dust proofing. In view of this, the shading correction value for flow reading is calculated by multiplying a shading correction value for a pressing plate by a predetermined coefficient so that a brightness value of the image read through the front side flow reading glass 102 becomes the same as a brightness value of an image read through the platen glass 101.

When the reading mode of the job to be started is different from the assumed reading mode or when the pressing-plate reading is designated in a state in which a document is placed on the document tray 201, the front side reading portion 104 is returned to the waiting position WP as indicated by the arrow E3 of FIG. 5C in order to again perform the shading operation. After returning the front side reading portion 104 to the waiting position WP, the front side LEDs 105 and 106 are turned on. Thereafter, the front side reading portion 104 is again moved to the shortest movement waiting position MP (the acceleration start position AP). When the (current) reading mode of the job to be started is the same as the assumed reading mode or the (current) reading method (flow reading) is the same as the assumed reading method (flow reading), the reader CPU 301 moves the front side reading portion 104 from the shortest movement waiting position MP to the flow reading position FP.

Operation of Switching Reading Mode

Now, control to be performed when the user has instructed to set the reading mode through use of the operation display unit 316 is described with reference to FIG. 9. When the system CPU 311 detects that the operation display unit 316 has received the user instruction relating to the reading mode, the system CPU 311 transmits the reading mode instructed to be set by the user to the reader CPU 301. The reader CPU 301 performs an operation of switching the reading mode described below.

Figure 9:
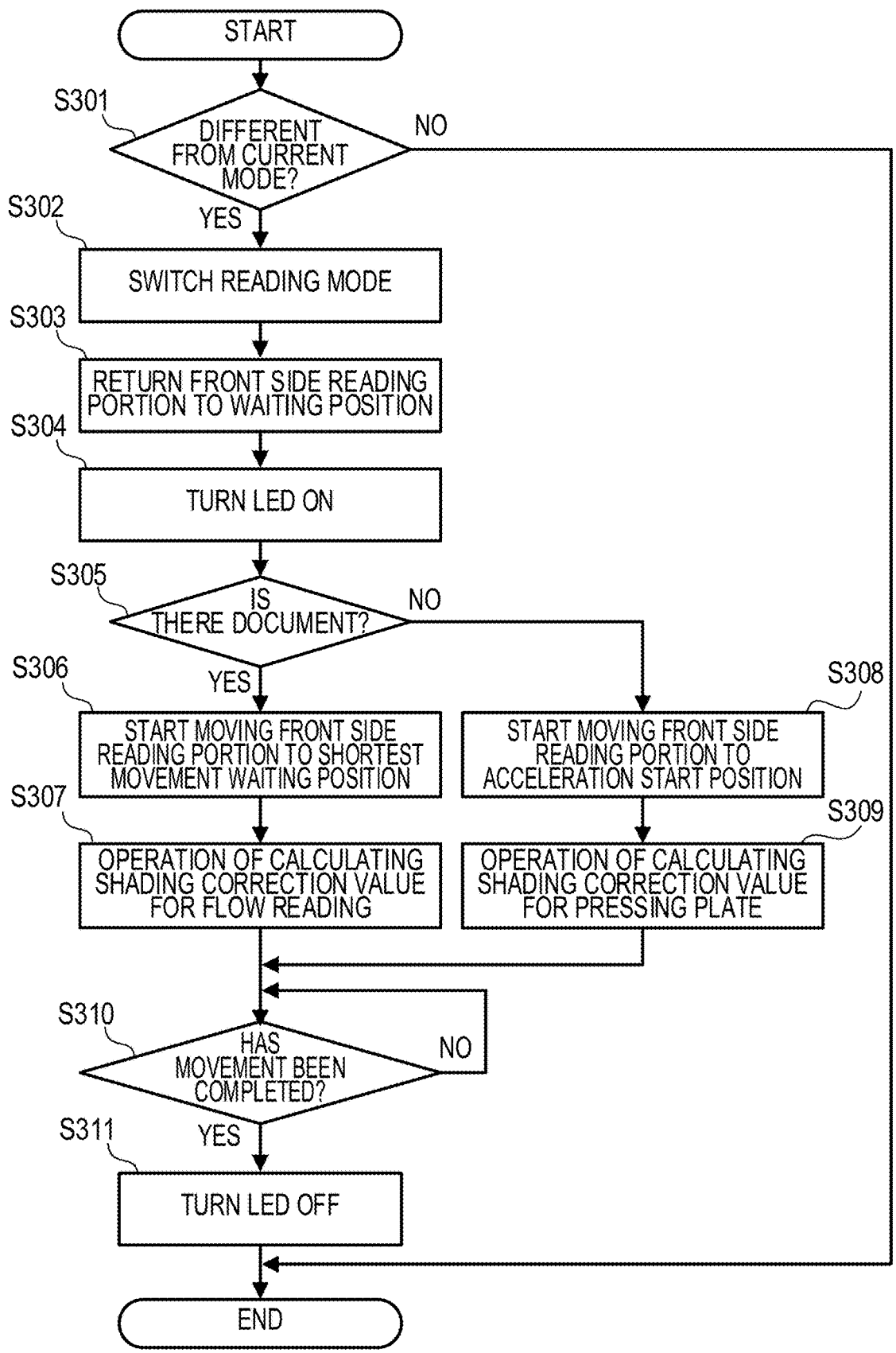
FIG. 9 is a flow chart for illustrating a control sequence to be performed when a user instructs to set a reading mode.

FIG. 9 is a flow chart for illustrating a control sequence to be performed when the user instructs to set the reading mode. Meanwhile, the flow chart shown in FIG. 9 illustrates a processing performed in a state in which a document is stacked on the document tray 201, that is, in a state in which the shading correction value for flow reading in calculated and the front side reading portion 104 is located at the shortest movement waiting position MP. The reader CPU 301 determines whether or not the received reading mode is different from the current reading mode (namely, reading mode corresponding to the calculated shading correction value) (Step S301). When the received reading mode of the job is the same as the current reading mode (NO in Step S301), the reader CPU 301 ends the control sequence without performing any operation. When the received reading mode of the job is different from the current reading mode (YES in Step S301), the reader CPU 301 switches the reading mode (Step S302). In order to again perform the operation of calculating the shading correction value, the reader CPU 301 returns the front side reading portion 104 from the shortest movement waiting position MP to the waiting position WP as indicated by the arrow E3 of FIG. 5C (Step S303).

After the front side reading portion 104 is returned to the waiting position WP, the reader CPU 301 turns on the front side LEDs 105 and 106 (Step S304). The reader CPU 301 determines whether or not a document is present on the document tray 201 (Step S305). When the document is present on the document tray 201 (YES in Step S305), the reader CPU 301 starts moving the front side reading portion 104 from the waiting position WP to the shortest movement waiting position MP as indicated by the arrow E1 of FIG. 5A (Step S306). While being moved from the waiting position WP to the shortest movement waiting position MP, the front side reading portion 104 performs the operation of calculating the shading correction value for flow reading in the shading region SA (Step S307). The reader CPU 301 calculates the shading correction value for flow reading in the shading region SA. After the operation of calculating the shading correction value for flow reading, the reader CPU 301 determines whether or not the movement of the front side reading portion 104 to the shortest movement waiting position MP has been completed (Step S310). When the movement of the front side reading portion 104 to the flow reading position FP has not been completed (NO in Step S310), the reader CPU 301 waits until the movement of the front side reading portion 104 to the flow reading position FP has been completed. When the movement of the front side reading portion 104 to the flow reading position FP has been completed (YES in Step S310), the reader CPU 301 turns off the front side LEDs 105 and 106 (Step S311), to thereby end the control sequence.

When a document is not present on the document tray 201 (NO in Step S305), the reader CPU 301 starts moving the front side reading portion 104 from the waiting position WP to the acceleration start position AP as indicated by the arrow E4 of FIG. 8A (Step S308). While being moved from the waiting position WP to the acceleration start position AP, the front side reading portion 104 performs the operation of calculating the shading correction value for a pressing plate in the shading region SA (Step S309). The reader CPU 301 calculates the shading correction value for a pressing plate in the shading region SA based on a target value (target) for a pressing plate. The target value (target) for a pressing plate is different from the target value (target) for flow reading. After the operation of calculating the shading correction value for a pressing plate, the reader CPU 301 determines whether or not the movement of the front side reading portion 104 to the acceleration start position AP has been completed (Step S310). When the movement of the front side reading portion 104 to the acceleration start position AP has not been completed (NO in Step S310), the reader CPU 301 waits until the movement of the front side reading portion 104 to the acceleration start position AP has been completed. When the movement of the front side reading portion 104 to the acceleration start position AP has been completed (YES in Step S310), the reader CPU 301 turns off the front side LEDs 105 and 106 (Step S311), to thereby end the control sequence.

Control Timings of Document Reading Portion and ADF

Figure 10A:
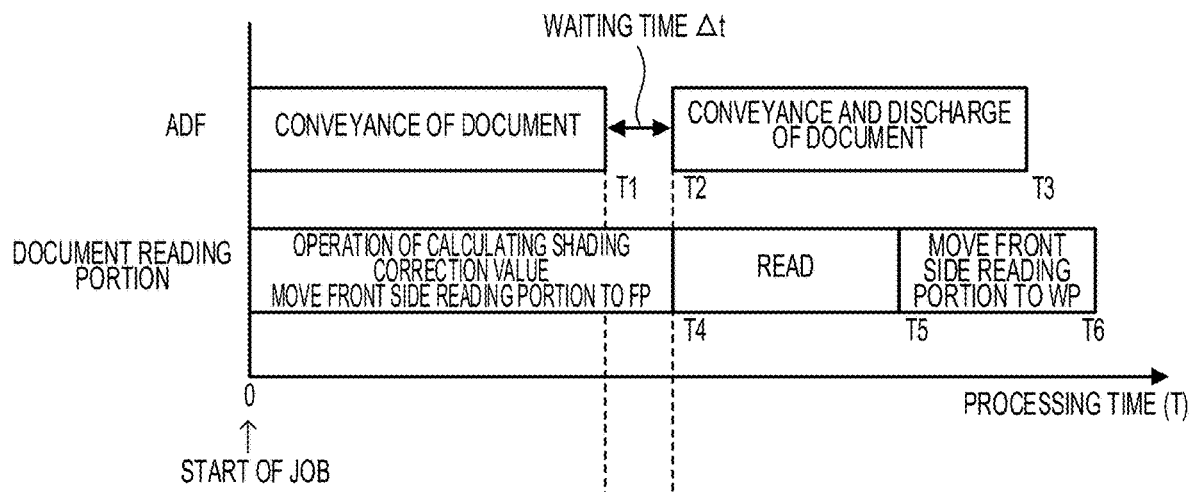
FIG. 10A and FIG. 10B are timing charts for illustrating control timings of the document reading portion and the ADF.
Figure 10B:
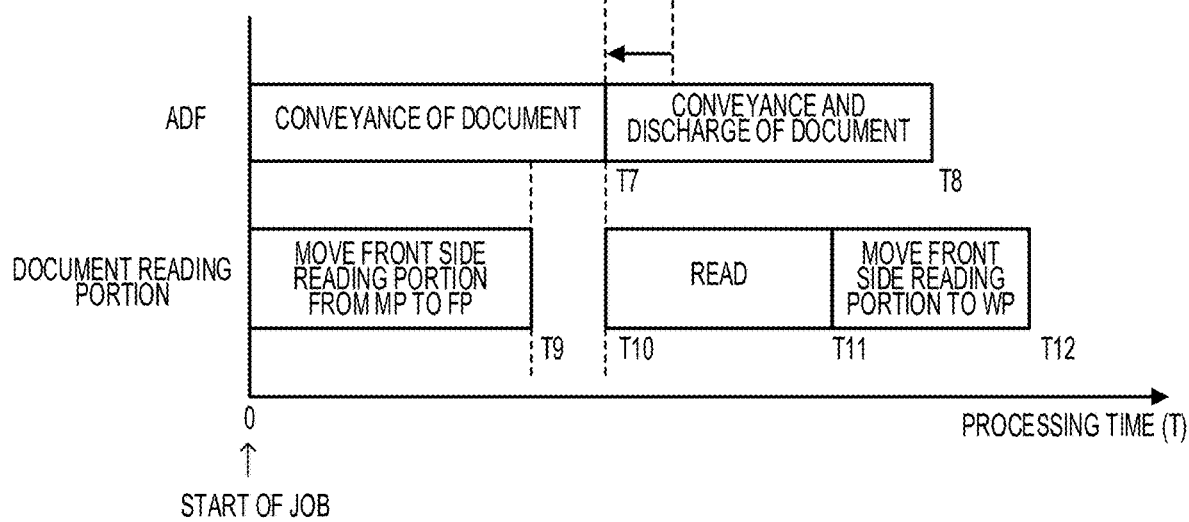

FIG. 10A and FIG. 10B are timing charts for illustrating control timings of the document reading portion 100 and the ADF 200. In FIG. 10A and FIG. 10B, T1 to T12 each represent an elapsed time from the start of the job. Now, a difference in processing time between cases in which the front side reading portion 104 is located at the waiting position WP and located at the shortest movement waiting position MP before the execution of flow reading is described with reference to FIG. 10A and FIG. 10B. FIG. 10A is the timing chart for illustrating the processing time required when the front side reading portion 104 is located at the waiting position WP. FIG. 10B is the timing chart for illustrating the processing time required when the front side reading portion 104 is located at the shortest movement waiting position MP.

When Front Side Reading Portion is Located at Waiting Position

With reference to FIG. 10A, the ADF 200 starts the conveyance of a document at the start of the job (T=0). At the same time, the document reading portion 100 starts processing (operation of calculating the shading correction value and movement of the front side reading portion 104 to the flow reading position FP). Before document reading is started by the front side reading portion 104, it is required to wait until the document reading portion 100 finishes performing the processing, and hence the ADF 200 temporarily stops the document at a predetermined position before the flow reading position FP (T1). When the document reading portion 100 finishes the processing (shading and movement of the front side reading portion 104 to the flow reading position FP) (T4), the ADF 200 restarts the conveyance of the document (T2). At the same time, the document reading portion 100 starts reading the image of the document by the front side reading portion 104 located at the flow reading position FP (T4). When the reading of the image of the document has been completed (T5), the document reading portion 100 starts moving the front side reading portion 104 to the waiting position WP (T5). The ADF 200 conveys the document to discharge the document onto the discharge tray 220 (T3). After that, the document reading portion 100 completes the movement of the front side reading portion 104 to the waiting position WP (T6).

When the front side reading portion 104 is located at the waiting position WP, as illustrated in FIG. 10A, the ADF 200 temporarily stops the conveyance of the document (T1) until the movement of the front side reading portion 104 to the flow reading position FP has been completed (T4), and again starts the conveyance of the document (T2). Therefore, the ADF 200 requires a waiting time Δt (=T2−T1).

When Front Side Reading Portion is Located at Shortest Movement Waiting Position A preparation operation (operation of calculating the shading correction value and movement of the front side reading portion 104 to the shortest movement waiting position MP) before the flow reading by the front side reading portion 104 has been completed, and the front side reading portion 104 is located at the shortest movement waiting position MP. With reference to FIG. 10B, the ADF 200 starts the conveyance of a document at the start of the job (T=0). At the same time, the document reading portion 100 starts moving the front side reading portion 104 from the shortest movement waiting position MP to the flow reading position FP. The movement of the front side reading portion 104 from the shortest movement waiting position MP to the flow reading position FP is completed (T9) before the document being conveyed by the ADF 200 reaches the flow reading position FP (T7). Therefore, the conveyance of the document can be continued as it is without temporarily stopping the document at a predetermined position before the flow reading position FP. When the document reaches the flow reading position FP (T7), the document reading portion 100 starts reading the image of the document by the front side reading portion 104 located at the flow reading position FP (T10). When the reading of the image of the document has been completed (T11), the document reading portion 100 starts moving the front side reading portion 104 to the waiting position WP (T11). The ADF 200 conveys the document to discharge the document onto the discharge tray 220 (T8). After that, the document reading portion 100 completes the movement of the front side reading portion 104 to the waiting position WP (T12).

When the front side reading portion 104 is located at the shortest movement waiting position MP, as illustrated in FIG. 10B, it is possible to move the front side reading portion 104 from the shortest movement waiting position MP to the flow reading position FP to read the document by the front side reading portion 104 without temporarily stopping the conveyance of the document. Therefore, the processing time can be reduced by a waiting time Δt (=T2−T1) from the time to temporarily stop the conveyance of the document (T1) until the time to again start the conveyance of the document (T2). As a result, the FCOT can be reduced.

In addition, when the current reading mode (for example, BW, CL, main-scanning resolution, sub-scanning resolution, copying, FAX, or transmission) is different from the reading mode of the job to be started, the front side reading portion 104 is returned to the waiting position WP in order to again perform the operation of calculating the shading correction value. In this case, a distance from the shortest movement waiting position MP to the waiting position WP is shorter than a distance from the flow reading position FP to the waiting position WP. Therefore, the front side reading portion 104 is caused to wait at the shortest movement waiting position MP, to thereby be able to reduce a time period required for returning the front side reading portion 104 to the waiting position WP.

According to the embodiment, when it is detected that a document is present on the document tray 201, it is possible to move the front side reading portion 104 from the waiting position WP to the shortest movement waiting position MP, and to simultaneously perform the operation of calculating the shading correction value for flow reading. Therefore, it is possible to eliminate a useless operation before the reading operation, and to achieve reduction in FCOT in the case of the flow reading.

According to the embodiment, the distance for moving the reading portion when the shading correction value is again calculated is shortened, to thereby be able to reduce a time period required for moving the reading portion to the waiting position in order to again calculate the shading correction value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-138630, filed Jul. 29, 2019, which is hereby incorporated by reference herein in its entirety.

What is claimed is:

1. A document reading apparatus, comprising:
a document tray on which a document is to be stacked;
a detector configured to detect presence or absence of the document on the document tray;
a conveyance unit configured to convey the document stacked on the document tray;
a platen on which a document is to be placed;
a reading unit which is movable in a predetermined direction, the reading unit configured to read the document while being moved under the platen in the predetermined direction in a case where the document placed on the platen is read, and the reading unit configured to read the document in a state in which the reading unit is stationary at a first position in the predetermined direction in a case where the document conveyed by the conveyance unit is read;
a receiver configured to receive an instruction indicating starting of a reading of the document;
a reference member;
a determiner configured to determine a shading correction value based on a result of reading the reference member by the reading unit; and
a corrector configured to perform shading correction using the shading correction value on image data which is output from the reading unit,
wherein, in a case where the detector detects a state in which the document is present on the document tray, the reading unit reads the reference member while being moved from a second position toward the first position and stops a third position, the third position being located between the first position and the second position in the predetermined direction,
wherein, in a case where the receiver receives the instruction and the detector detects the state in which the document is present on the document tray, the reading unit stopped at the third position moves from the third position to the first position and reads the document conveyed by the conveyance unit, and
wherein, in a case where the shading correction value is to be again determined in a period from a first timing when the shading correction value has been determined due to the detector detecting the state in which the document is present on the document tray until a second timing when the receiver receives the instruction, the reading unit stopped at the third position moves from the third position to the second position and reads the reference member while being moved from the second position toward the first position.

2. The document reading apparatus according to claim 1, wherein the reading unit includes:
a light source; and
an image sensor configured to receive light reflected from the document illuminated by the light source.

3. The document reading apparatus according to claim 1, wherein, in the predetermined direction, the second position is included in a range in which the reference member is provided.

4. The document reading apparatus according to claim 1, wherein the second position is located on a side opposite to the third position with respect to a shading region of the reference member to be read by the reading unit.

5. The document reading apparatus according to claim 1, wherein the third position is an acceleration start position for starting acceleration of the reading unit which is moved in the predetermined direction in order to read the image of the document placed on the platen.

6. The document reading apparatus according to claim 1, wherein a target value for calculating the shading correction value which is used to perform the shading correction on the image data output from the reading unit in a case where the reading unit reads the document conveyed by the conveyance unit is different from a target value for calculating the shading correction value which is used to perform the shading correction on the image data output from the reading unit in a case where the reading unit reads the document placed on the platen.

7. The document reading apparatus according to claim 1, wherein, in a case where a change, from the state in which the document is present on the document tray to a state in which the document is not present on the document tray, is detected before the receiver receives the instruction, the reading unit stopped at the third position moves from the third position to the second position.

8. The document reading apparatus according to claim 1, wherein the reading unit includes a first reading method in which the document on the platen is read and a second reading method in which the document conveyed by the conveyance unit is read, and
wherein the case where the shading correction value is to be again determined in the period from the first timing until the second timing corresponds to a case where a reading mode in the second reading method is changed.

9. The document reading apparatus according to claim 8, wherein the reading mode includes a first reading mode in which the reading unit reads the document at a first resolution, and a second reading mode in which the reading unit reads the document at a second resolution higher than the first resolution.

10. The document reading apparatus according to claim 1, wherein the reading unit includes a first reading method in which the document on the platen is read and a second reading method in which the document conveyed by the conveyance unit is read, and
wherein the case where the shading correction value is to be again determined in the period from the first timing until the second timing corresponds to a case where a reading method for reading the document is changed from the second reading method to the first reading method.

* * * * *